Patented Mar. 10, 1953

2,631,106

UNITED STATES PATENT OFFICE 2,631,106

DIAMOND-LIKE COMPOSITION OF MATTER

Wladimir W. Mitkewich, Hopewell, Va.

No Drawing. Application June 21, 1949,
Serial No. 100,537

8 Claims. (Cl. 106—42)

This invention relates to an adamantine substance or composition of matter having the brilliancy and attractiveness of diamond.

The sparkle and brilliance of diamonds is the result of a high index of refraction, namely 2.417, together with the clear crystalline structure of the carbon. This index of refraction compares with about 1.52 to 2.02 for various types of glass.

It is therefore the chief object of the invention to provide a glass-like substance of clear, substantially colorless appearance, having an index of refraction of 2.417 or even greater.

Other objects and aims will be apparent from the following description.

There are many substances having an index of refraction as great as, or greater than, genuine diamond. As examples, may be cited iron oxide, $F_2O_3$, hematite which has an index of refraction of 3.01 and titanium oxide, $TiO_2$, rutile, which has an index of refraction of 2.60. Synthetic rutile has a light yellow tint while natural rutile comes in various tints and shades of brown. Both synthetic and natural rutile have been cut into ornamental stones or gems.

It is a well-know fact that any color can be neutralized by adding to the color a measured or predetermined amount of its complementary color which, in the case of yellow, is purple. Thus, I have found that if a trace of blue coloring matter, such as oxide or salt of cobalt, is added to rutile, the resulting substance is a light green color. If, to this, is added a trace of red coloring agent, such as a compound of selenium, metallic gold dissolved in silica, or gold chloride, the result is a neutral light tint of gray. Since purple, the complementary color of yellow, can be regarded as a combination, in varying proportions, of red and blue, it is also possible to use, in substitution for the blue and red coloring substances just mentioned, various purple coloring manganese compounds.

While the amounts of pigment added, are microscopic, the yellow tint of the rutile is neutralized to an invisible tint of gray resulting in an adamantine substance having all the sparkle, lustre and brilliance of real diamond.

A suitable material for use where the color of rutile is to be modified by admixture of a clear, transparent, colorless substance, to render the yellow tint in rutile less intense, is dense barium flint glass which has a composition about as follows:

| | Percent |
|---|---|
| $SiO_2$ | 37.0 |
| $K_2O$ | 2.7 |
| $B_2O_3$ | 5.0 |
| BaO | 47.0 |
| ZnO | 8.3 | or, if color neutralization is to be effected by the addition of proper amounts of red and blue pigments, both red and blue may be supplied by any commercial form of red or blue glass. Or the barium flint glass whose composition is given, supra, may be colored medium dark blue by the addition of cobalt oxide, CoO. Red pigment may be supplied by having barium flint glass colored medium dark red by the addition of metallic gold or a compound of selenium.

For the specific composition of colored glasses suitable for use in the practice of my invention, reference may be had to "The Chemical Formulary" edited by H. Bennett, vol. IV, page 213, published in 1939 by Chemical Publishing Company, New York city, wherein the composition of various colors of glasses is given including the following:

Red ruby glass

| | | |
|---|---|---|
| Sand | g | 1000 |
| Soda ash | g | 180 |
| Potash | g | 150 |
| Selenium | g | 1 |
| Limespar | g | 150 |

Bright blue glass

| | | |
|---|---|---|
| Soda ash | g | 380 |
| Limespar | g | 240 |
| Cobalt oxide | g | 2.8 |
| Manganese dioxide | g | 0.5 |
| Sand | g | 1000 |

Dark blue glass

| | | |
|---|---|---|
| Sand | g | 500 |
| Limespar | g | 75 |
| Soda ash | g | 175 |
| Cobalt oxide | g | 1 |

Violet glass

| | | |
|---|---|---|
| Sand | g | 1000 |
| Limespar | g | 140 |
| Potash | g | 300 |
| Niter | g | 60 |
| Manganese dioxide | g | 40 |

See also "Handbook of Chemistry and Physics," 31st edition, pages 313–314, published in 1949, where it is explained that "colloidal gold has been used to color ruby cathedral glass windows." For a further explanation of the use of gold chloride, selenium, selenium nitrate, and colloids of gold and copper in the production of red glass, reference may be had to University of Illinois Bulletin, vol. XI, No. 47, dated July 30, 1924, pages 1 and 2 of an article by A. E. Williams entitled "Notes on the development of ruby color in glass."

In the preparation of the diamond-like substance forming the subject of my invention, the rutile and glass pigment material to be used, are all reduced to a fine powder, thoroughly mixed, and brought to or somewhat above, the melting point of the ingredients used.

While it will be understood that the proportions and percentages of material used will vary somewhat, depending upon the original color of the rutile used and the color of the neutralizing glass, the following examples are cited as a result of successful experiments and production.

EXAMPLE 1

|  | Percent |
|---|---|
| Titanium oxide | 97.995 |
| Commercial blue glass or barium flint glass with cobalt oxide added | 2.000 |
| Commercial red glass or barium flint glass with metallic gold or selenium compound added | .005 |
| Total | 100.000 |

EXAMPLE 2

|  | Percent |
|---|---|
| Titanium oxide | 73.999 |
| Barium flint glass | 25.000 |
| Commercial blue glass or its substitute cited | 1.000 |
| Commercial red glass or its substitute cited | 0.001 |
| Total | 100.000 |

In Example 1, a melting or fusing temperature equal to or somewhat above the melting point of the titanium oxide is used, namely, about 1825° C. In Example 2, a melting or fusing temperature equal to the melting temperature of barium flint glass, namely, about 1000° C., is employed.

In each example, the mixed powdered ingredients are thoroughly heated to the indicated temperature, then cooled. The cooled crystalline mass is then struck, as with a hammer, to crack the material in half along the plane of maximum internal stress developed during cooling. This relieves further internal stresses in the cracked mass and avoids further splitting or cracking.

The resulting material is a clear hard adamantine substance having an index of refraction equal to, or greater than, diamond, which may be cut and polished into stones of a brilliancy and luster equal to that of cut and polished diamond.

In Example 1, the index of refraction of the rutile, is not materially reduced from its value of 2.60. In Example 2, the substantial percentage of $SiO_2$ in the barium flint glass used, reduces the index of refraction from 2.60 to approximately 2.417 which corresponds to the index of refraction of diamond. At the same time, the yellow tint of the rutile is substantially eliminated, which is of tremendous importance in the production of a substance having the sparkle and brilliance of genuine diamond. By a slight increase of the blue pigment material, whether commercial glass or barium flint glass with cobalt oxide added, the resulting substance is equal in appearance to diamond of the first water.

While I have described the preferred procedure in producing the substance forming the invention and have given specific examples of the steps employed, it will be obvious to those skilled in the art, after a study of the foregoing disclosure, that various slight changes in percentages may be resorted to without departing from the spirit and scope of the invention. Consequently, it is my desire and intention to reserve all such changes, and modifications as fall within the scope of the sub-joined claims.

In the claims by the word "diamond" is meant genuine diamond. By "diamond-like" is meant having the appearance of genuine diamond.

Having now fully disclosed the invention, what I claim and desire to secure by Letters Patent is:

1. A diamond-like substance consisting essentially of a fusion of titanium oxide 74%, barium flint glass 25%, commercial blue glass 1% and a minute amount of commercial red glass.

2. An adamantine homogeneous composition of matter consisting of a fusion of 97.995% synthetic rutile, 2.00% blue glass, and .005% red glass, said composition having an index of refraction of about 2.4.

3. A clear crystalline adamantine homogeneous composition consisting essentially of a fusion of a major proportion of synthetic rutile, about 2% of blue glass and a small but effective amount of red glass, the said glasses neutralizing the otherwise yellowish tint of the rutile, said composition having an index of refraction of about 2.4.

4. A clear adamantine composition comprising a homogeneous fusion of rutile and glass having an initial color complementary to the initial color of the rutile, the amount of glass being small but effective to neutralize the initial color of the rutile, said composition being substantially colorless and transparent, with an index of refraction of about 2.4.

5. A solid homogeneous substantially transparent composition of matter consisting essentially of a fusion of rutile and purple glass, the amount of said glass being small but effective to neutralize the otherwise yellowish tint of the rutile, said composition of matter having an index of refraction of at least about 2.4.

6. An adamantine homogeneous composition synthetic rutile about 75%, blue glass about 1% and red glass about .001%, said composition resulting from the fusion under heat, of said rutile, blue glass and red glass, and having an index of refraction of at least 2.4.

7. An adamantine composition of matter resulting from the fusion of synthetic rutile and red and blue glass, the amounts of glass being small but effective to neutralize the otherwise yellow tint of the rutile, said composition being substantially clear and colorless and having an index of refraction of about 2.4.

8. A clear transparent adamantine composition of matter consisting essentially of a homogeneous fusion of a major proportion of rutile, from about 1% to 2% of blue glass and a small but effective amount of red glass.

WLADIMIR W. MITKEWICH.

No references cited.